(12) United States Patent
Song

(10) Patent No.: US 12,337,947 B2
(45) Date of Patent: *Jun. 24, 2025

(54) DISPERSION STRUCTURE FOR IMPACT

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 150 days.

This patent is subject to a terminal disclaimer.

(21) Appl. No.: 18/233,524

(22) Filed: Aug. 14, 2023

(65) Prior Publication Data

US 2024/0199189 A1    Jun. 20, 2024

(30) Foreign Application Priority Data

Dec. 19, 2022    (KR) .................. 10-2022-0178544

(51) Int. Cl.
 *B64C 1/06*    (2006.01)
(52) U.S. Cl.
 CPC .................................. *B64C 1/062* (2013.01)
(58) Field of Classification Search
 CPC .......... B64C 1/062; B60R 19/34; B63B 59/02
 See application file for complete search history.

(56) References Cited

U.S. PATENT DOCUMENTS

| | | | | |
|---|---|---|---|---|
| 1,187,841 A | * | 6/1916 | Jelalian | B63B 59/02 114/219 |
| 3,063,399 A | * | 11/1962 | Schuyler | B63B 59/02 114/219 |
| 5,314,229 A | * | 5/1994 | Matuzawa | B60R 21/0136 293/133 |
| 5,451,015 A | * | 9/1995 | Cronkhite | B64D 37/02 244/119 |
| 6,959,894 B2 | * | 11/2005 | Hayashi | B64C 1/062 267/140 |
| 7,695,052 B2 | * | 4/2010 | Nusier | B62D 21/152 293/133 |
| 7,810,437 B2 | * | 10/2010 | Mattschull | B61D 17/06 213/220 |
| 7,997,529 B2 | * | 8/2011 | Koch | B64C 1/12 244/121 |
| 8,056,850 B2 | * | 11/2011 | Lin | B64C 1/40 244/119 |
| 8,118,286 B2 | * | 2/2012 | Chong | B60R 19/00 267/116 |
| 8,398,021 B2 | * | 3/2013 | Koch | B64C 1/10 244/119 |

(Continued)

FOREIGN PATENT DOCUMENTS

| | | | | |
|---|---|---|---|---|
| CN | 106945799 A | * | 7/2017 | ............. B63B 43/18 |
| CN | 110816455 A | * | 2/2020 | |

(Continued)

*Primary Examiner* — Joseph W Sanderson
(74) *Attorney, Agent, or Firm* — Banner & Witcoff, Ltd.

(57) ABSTRACT

Proposed is a structure. The structure includes a front body frame configured to surround a front surface of an airframe, a crash unit disposed at a front end of the body front frame, and a dash reinforcement assembly fastened to the front body frame and disposed on the rear surface of the crash unit.

18 Claims, 13 Drawing Sheets

(56) References Cited

U.S. PATENT DOCUMENTS

| | | | | |
|---|---|---|---|---|
| 8,434,716 | B2* | 5/2013 | Koch | B64C 1/36 244/119 |
| 8,843,246 | B2* | 9/2014 | Fraser | B63B 43/18 293/133 |
| 8,905,352 | B2* | 12/2014 | Bernadet | B64C 1/10 244/119 |
| 9,517,831 | B2* | 12/2016 | Fink | B64C 1/062 |
| 9,617,013 | B2* | 4/2017 | Mairou | B64C 27/04 |
| 9,650,075 | B2* | 5/2017 | Murayama | B62D 21/152 |
| 9,688,381 | B2* | 6/2017 | Fink | B64C 1/062 |
| 10,189,428 | B1* | 1/2019 | Sellars | B60R 19/34 |
| 10,272,952 | B2* | 4/2019 | Gerhardt | B62D 21/02 |
| 10,479,408 | B2* | 11/2019 | Upah | B62D 23/005 |
| 10,822,111 | B2* | 11/2020 | Prud'Homme | B64D 45/00 |
| 11,014,691 | B2* | 5/2021 | Murray | B64C 1/10 |
| 11,040,679 | B2* | 6/2021 | Hisada | B60R 19/34 |
| 11,279,470 | B2* | 3/2022 | Murray | B64C 1/061 |
| 11,420,731 | B2* | 8/2022 | Murray | B64C 25/04 |
| 12,172,744 | B2* | 12/2024 | Song | B64D 41/00 |
| 2005/0001093 | A1* | 1/2005 | Hayashi | F16F 7/124 244/17.17 |
| 2007/0164159 | A1* | 7/2007 | Koch | B64C 1/36 244/121 |
| 2008/0149769 | A1* | 6/2008 | Koch | B64C 1/062 244/121 |
| 2008/0238115 | A1* | 10/2008 | Chong | B60R 19/00 293/132 |
| 2008/0238146 | A1* | 10/2008 | Nusier | B62D 21/152 296/193.09 |
| 2009/0058109 | A1* | 3/2009 | Mattschull | B60R 19/14 293/102 |
| 2009/0184206 | A1* | 7/2009 | Lin | B32B 15/20 244/129.1 |
| 2010/0155533 | A1* | 6/2010 | McKinnie | B64C 1/10 244/121 |
| 2011/0101164 | A1* | 5/2011 | Koch | B64C 1/36 156/60 |
| 2011/0297785 | A1* | 12/2011 | Itakura | B64C 1/062 244/119 |
| 2013/0087657 | A9* | 4/2013 | Koch | B64C 1/10 156/60 |
| 2013/0146710 | A1* | 6/2013 | Bernadet | B64C 25/14 244/119 |
| 2013/0197717 | A1* | 8/2013 | Fraser | B63B 43/18 701/2 |
| 2015/0122940 | A1* | 5/2015 | Mairou | B64C 27/04 244/17.11 |
| 2015/0136906 | A1* | 5/2015 | Fink | B64C 1/18 244/119 |
| 2015/0183505 | A1* | 7/2015 | Fink | B64C 1/06 244/119 |
| 2016/0121934 | A1* | 5/2016 | Murayama | B62D 21/152 296/187.09 |
| 2017/0247085 | A1* | 8/2017 | Jiang | B64C 1/062 |
| 2018/0134317 | A1* | 5/2018 | Gerhardt | B60J 1/002 |
| 2018/0155006 | A1* | 6/2018 | Arana Hidalgo | B64C 5/02 |
| 2018/0208325 | A1* | 7/2018 | Prud'Homme Lacroix | B64C 1/0009 |
| 2019/0217894 | A1* | 7/2019 | Upah | B62D 3/126 |
| 2020/0238935 | A1* | 7/2020 | Hisada | B60R 19/34 |
| 2021/0031903 | A1* | 2/2021 | Murray | B64C 1/10 |
| 2021/0031904 | A1* | 2/2021 | Murray | B64C 1/10 |
| 2021/0031948 | A1* | 2/2021 | Murray | B64C 1/0683 |
| 2024/0166354 | A1* | 5/2024 | Song | B64C 1/062 |
| 2024/0253761 | A1* | 8/2024 | Song | B64C 3/185 |
| 2024/0308638 | A1* | 9/2024 | Song | B64C 25/52 |
| 2024/0317383 | A1* | 9/2024 | Song | H01M 50/579 |
| 2024/0322337 | A1* | 9/2024 | Song | B64C 1/062 |
| 2024/0336347 | A1* | 10/2024 | Song | B64C 3/185 |
| 2024/0339711 | A1* | 10/2024 | Song | B64C 1/062 |

FOREIGN PATENT DOCUMENTS

| | | | | |
|---|---|---|---|---|
| CN | 111114744 A | * | 5/2020 | |
| CN | 111348170 A | * | 6/2020 | |
| CN | 111806560 A | * | 10/2020 | |
| DE | 102009031745 A1 | * | 1/2011 | B60R 19/12 |
| EP | 1652733 A1 | * | 5/2006 | B60R 19/12 |
| EP | 3715239 A1 | * | 9/2020 | |
| FR | 2925431 A3 | * | 6/2009 | B60R 19/36 |
| KR | 20090059527 A | * | 6/2009 | |
| KR | 20110054167 A | * | 5/2011 | |
| KR | 101901581 B1 | | 9/2018 | |
| WO | WO-2019183874 A1 | * | 10/2019 | B63B 17/00 |

* cited by examiner

[ A-A CROSS-SECTION ]

[ C-C CROSS-SECTION ]

[ B-B CROSS-SECTION ]

[ D-D CROSS-SECTION ]

DISPERSION STRUCTURE FOR IMPACT

CROSS REFERENCE TO RELATED APPLICATION

The present application claims priority to Korean Patent Application No. 10-2022-0178544, filed Dec. 19, 2022 the entire contents of which is incorporated herein for all purposes by this reference.

TECHNICAL FIELD

The present disclosure relates to a dispersion structure for impact and, more preferably, a dispersion structure for impact configured to transmit impact, which is applied to the airframe of an Urban Air Mobility (UAM) through a crash unit disposed at the front of the UAM, to the front of the body and the floor and to absorb the impact.

BACKGROUND

Recently, as businesses about various kinds of ground mobilities or air mobilities are rapidly developing, mobilities may use a structural safety device for reducing impulse that is applied to passengers when an emergency such as an accident occurs in ground mobilities or air mobilities.

As for a ground mobility, when an emergency occurs, impact may be transmitted to the car body in the longitudinal direction or the width direction of the mobility. However, since air mobilities moves in the air, if an air mobility collides with the ground, impact may be applied in a different direction from that of a ground mobility. Additionally, there may be a problem that large impulse may be applied in comparison to ground mobilities.

Accordingly, it is structurally important for an air mobility to address the above issues and other shortcomings.

SUMMARY

The following summary presents a simplified summary of certain features. The summary is not an extensive overview and is not intended to identify key or critical elements.

Systems, apparatuses, and methods are described for a structure. The structure may include a front body frame configured to surround a front surface of an airframe, a crash unit disposed at a front end of the front body frame, and a dash reinforcement assembly fastened to the front body frame and disposed on a rear surface of the crash unit.

Also or alternatively a structure may include a front body frame configured to surround a front surface of an airframe, a crash unit disposed at a front end of the front body frame and configured such that a lower end is inclined in a longitudinal direction of the airframe, and a dash reinforcement assembly fastened to the front body frame and disposed on a rear surface of the crash unit.

These and other features and advantages are described below in greater detail.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Figure 1:
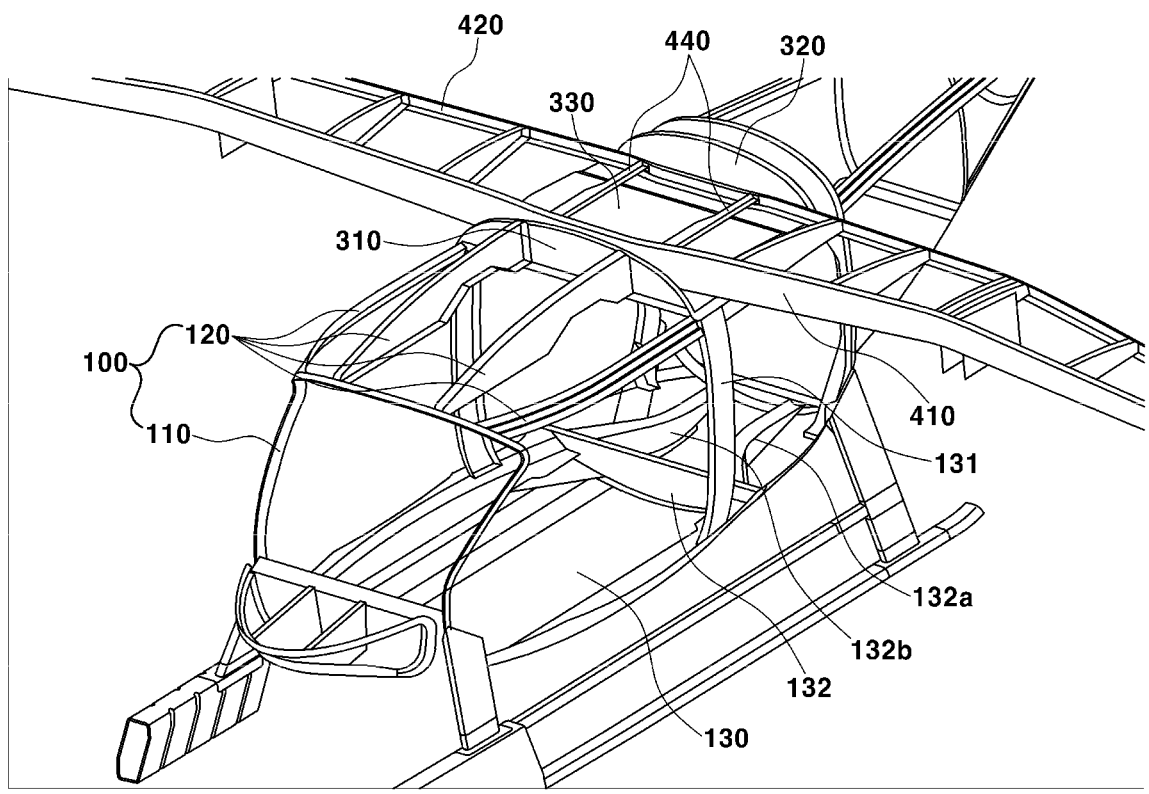
FIG. 1 shows a dispersion structure for impact of a body according to one or more aspects of the present disclosure.

Hereinafter, examples of the present disclosure will be described in detail with reference to the accompanying drawings. Examples of the present disclosure may be modified in various ways and the scope of the present disclosure should not be construed as being limited to the aspects described below. The examples are provided to more completely explain the present disclosure to those skilled in the art.

Terms "~er", "~unit", "member", etc. used herein mean the units for processing at least one function or operation and may be implemented as software or hardware.

When a component is "connected" to another component in the specification, it includes not only direct connection, but also indirect connection, and the indirect connection includes connection through a wireless communication network.

The term "upper end" stated herein means a direction going to the upper end in the height direction in the drawings, and the term "lower end" means a direction going to the lower end in the height direction in the drawings.

When an element is "on" or "over" another component in the specification, it can be directly on the other element, or intervening elements may be present therebetween. When an element is "beneath" or "under" another component, it can be directly beneath the other element, or intervening elements may be present therebetween.

In the specification, a "height direction", a "width direction", and a "longitudinal direction" are based on a body.

The term "center" stated in the specification means the center in the width direction of a body, and the term "side" means both ends in the width direction of the body.

The term "body" stated herein may be an Urban Air Mobility (UAM), and the specification exemplifies that a UAM crashes and a front collision occurs.

The present disclosure includes an Urban Air Mobility (UAM) and provides a dispersion structure for impact configured such that a front collision load of a body 10 may be transmitted to a window frame 110 and a floor frame 130 through a crash unit 1200 disposed at, e.g., the front of the UAM.

Hereafter, FIGS. 1 to 6 show a dispersion structure for impact of an urban air mobility. The structure disposed at the front of a body 10, for example, as a dispersion structure for impact, is additionally described with reference to FIGS. 7 to 12.

Figure 2:
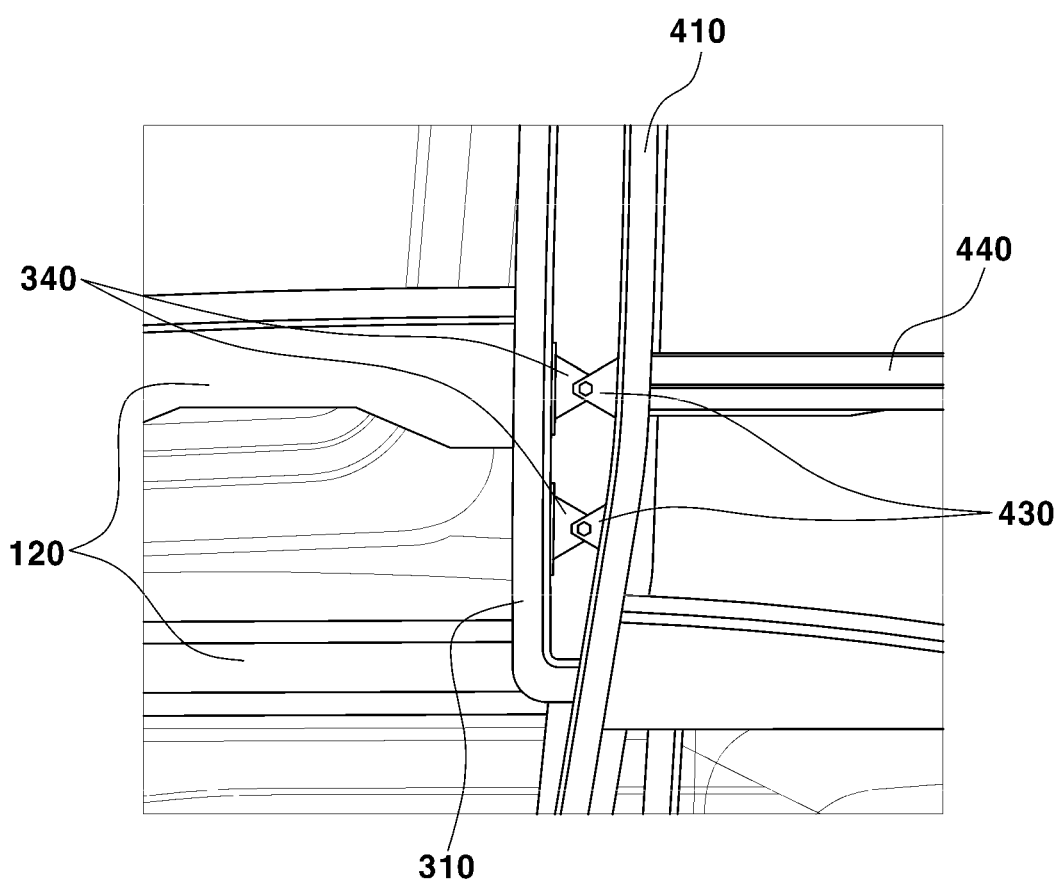
FIG. 2 is a side perspective view of the dispersion structure for impact of a body and shows a fastening relationship of a support fitting member and a wing fitting member according to one or more aspects of the present disclosure.

FIG. 1 shows a dispersion structure for impact of a body according to one or more aspects of the present disclosure and FIG. 2 is a side perspective view of the dispersion structure for impact of a body and shows a fastening relationship of a support fitting member and a wing fitting member according to one or more aspects of the present disclosure.

Figure 3:
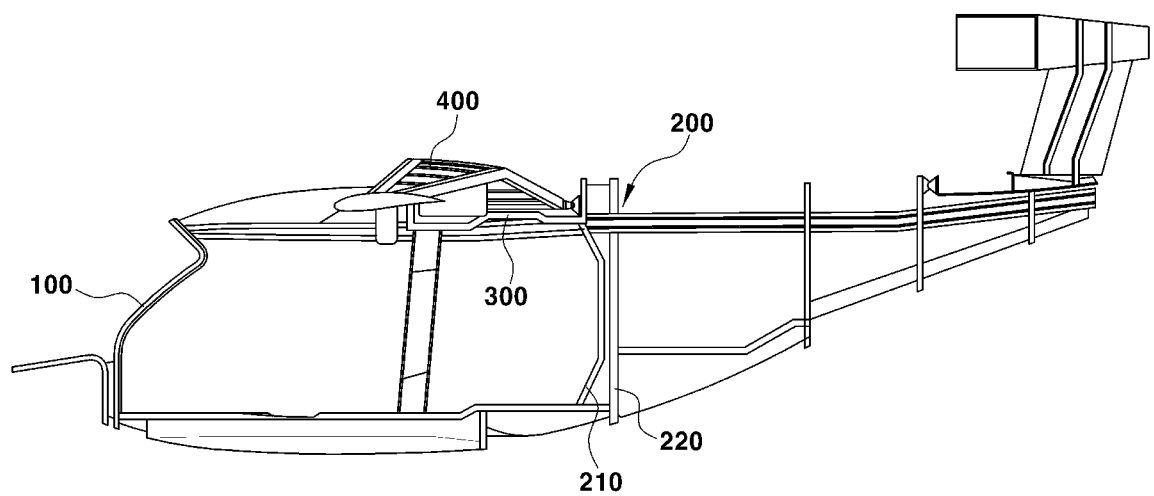
FIG. 3 shows a rear unit of the dispersion structure for impact of a body according to one or more aspects of the present disclosure.

Referring to FIGS. 1, 2, and 3 a dispersion structure for impact of a body may include a support unit 300 connected to a wing unit 400 between a front unit 100 and a rear unit 200 and may be configured to disperse a load, which is applied to the body, to the wing unit 400 and the rear of the body. In more detail, a longitudinal load and a height-directional load that come into the body may be transmitted through a connection structure of the front unit 100 and the support unit 300, a connection structure of the support unit 300 and the rear unit 200, and the connection structure of the support unit 300 and the wing unit 400, whereby an impact load coming into a space where a passenger is positioned can be reduced.

The front unit 100 may be disposed at the front end with respect to the wings of the body. The front unit 100 may include a window frame 110 on which a windshield glass may be mounted and a roof frame 120. The roof frame 120 may be connected to the rear end of the window frame 110 and may extend in the longitudinal direction of the body. The window frame 110 may be a frame surrounding the windshield glass on the front of the body. The roof frame 120 may be configured to be fastened to the upper end of the window frame 110, and a plurality of roof frames 120 may be formed with gaps in the width direction of the window frame 110. According to one or more aspects, as shown in FIG. 1, two roof frames 120 may be formed at the center, and two roof frames 120 may be formed at respective sides in the width direction of the window frame 110, and the four roof frames 120 may be configured to have the same gaps. A floor frame 130, which may configure and/or define the floor of the body, may divide the interior space inside the front unit 100 and may be divided into a first row passenger space at the front and a second row passenger space at the rear. According to one or more aspects, the floor frame 130 may be divided into a first row passenger space and a second row passenger space with a rear bulk head 132 therebetween. The rear bulk head 132 may have a pair of connection frames 132a and 132b connected to a second rear frame 220 to be described below.

The support unit 300 may be disposed between the front unit 100 and the rear unit 200. The roof frame 120 may be connected to the support unit 300. That is, the rear end of the roof frame 120 may be connected to the front end of the support unit 300. The support unit 300 may be connected to the front unit 100 and the rear unit 200 to disperse a load, which is applied to the front of the body, to the rear. In more detail, the support unit 300 may include a first flange part 310, a second flange part 320, a plate part 330, and a support fitting member 340.

The support unit 300 may be configured such that the first flange part 310 and the second flange part 320 face each other with the plate part 330 therebetween. The inside of the support unit 300 may include a space where the first flange part 310 and the second flange part 320 may be fastened to face each other. The first flange part 310 may be connected to the rear end of the roof frame 120. For example, the rear end of the roof frame 120 may be connected to the front outer surface of the first flange part 310. The second flange part 320 may be connected to the front end of the rear unit 200. The front end of the rear unit 200 may be connected to the rear outer surface of the second flange part 320.

The plate part 330 may be formed between the first flange part 310 and the second flange part 320. More preferably, the plate part 330 may configure and/or define a rear surface of a recessed section between the first flange part 310 and the second flange part 320 disposed at both sides in the longitudinal direction. The plate part 330 may be formed in a plate shape between the lower ends of the first flange part 310 and the second flange part 320. The plate part 330 may be connected to members forming the outer frame of the body to transmit a longitudinal load and a height-directional load of the body.

The support fitting member 340 may be formed on both inner surface of the first flange part 310 and the second flange part 320. According to one or more aspects, two support fitting members 340 may be formed left and right sides, respectively, in the width direction on the inner side the first flange part 310. Further, two support fitting members 340 may be formed left and right sides, respectively, in the width direction on the inner side the second flange part 320. First ends of the supporting members 340 may be disposed at corresponding positions inside the first flange part 310 and the second flange part 320, and coupling portions may be formed at second ends of the first flange part 310 and the second flange part 320 that correspond to both ends of the support fitting members 340, whereby the first flange part 310 and the second flange part 320 can be fastened to the support fitting members 340.

The wing unit 400 may be disposed inside the support unit 300. The wing unit 400 may be connected to the support unit 300 such that a load may be dispersed through the wing unit 400 in a collision of the body. The wing unit 400 may be composed of a first framework 410, a second framework 420, a wing fitting member 430, a wing frame 440, and a skin 450. The first framework 410 may extend in the width direction of the body at a predetermined distance inside from the first flange part 310. The second framework 420 may extend in the width direction of the body at a predetermined distance inside from the second flange part 320. The first framework 410 may configure and/or define the transverse frame at the front end of the wing unit 400 and the second framework 420 may configure and/or define the transverse frame at the rear end of the wing unit 400.

The wing fitting member 430 may be formed on the outsides of the first framework 410 and the second framework 420 at positions corresponding to the support fitting members 340 in the longitudinal direction. The outer side of the first framework 410 at which the wing fitting member 430 is disposed may mean the direction in which the first framework 410 faces the first flange part 310, and the outer side of the second framework 420 at which the wing fitting member 430 is disposed may mean the direction in which the second framework 420 faces the second flange part 320.

The wing fitting member 430 may be connected to the support fitting member 340. According to one or more aspects, two wing fitting members 430 may be formed at left and right sides, respectively, in the width direction on the outer side of the first framework 410. Further, two wing fitting members 430 may be formed on left and right sides, respectively, in the width direction on the outer side of the second framework 420. A first end of the wing fitting member 430 may be fixed to the outer sides of the first framework 410 and the second framework 420, and a coupling portion may be formed at a second end thereof. The coupling portion of the support fitting member 340 and the coupling portion of the wing fitting member 430 may be fastened to each other and the wing unit 400 may be fixed to the support unit 300.

The wing frame 440 may be formed between the first framework 410 and the second framework 420. A wing fitting member 430 may be disposed at a position corresponding to a longitudinal first end of the wing frame 440. As shown in FIG. 1, two wing frames 440 may be formed between the first framework 410 and the second framework 420 disposed over the plate part 330. Further, the wing frame 440 may be disposed between the first framework 410 and the second framework 420 such that a load applied to the first framework 410 and the second framework 420 can be transmitted to each other.

The skin 450 may be configured to cover the outer sides of the first framework 410 and the second framework 420. More preferably, the skin 450 may be disposed in contact with the tops of the first framework 410 and the second framework 420. The skin 450 disposed in contact with the tops of the first framework 410 and the second framework 420, as described above, may be configured such that a load transmitted to the first framework 410 and the second framework 420 may be dispersed in the longitudinal direction or the width direction of the wing unit 400. A load that is applied in the longitudinal direction of the body can be dispersed to the wing unit 400 through the front unit 100 and the support unit 300.

Figure 4:
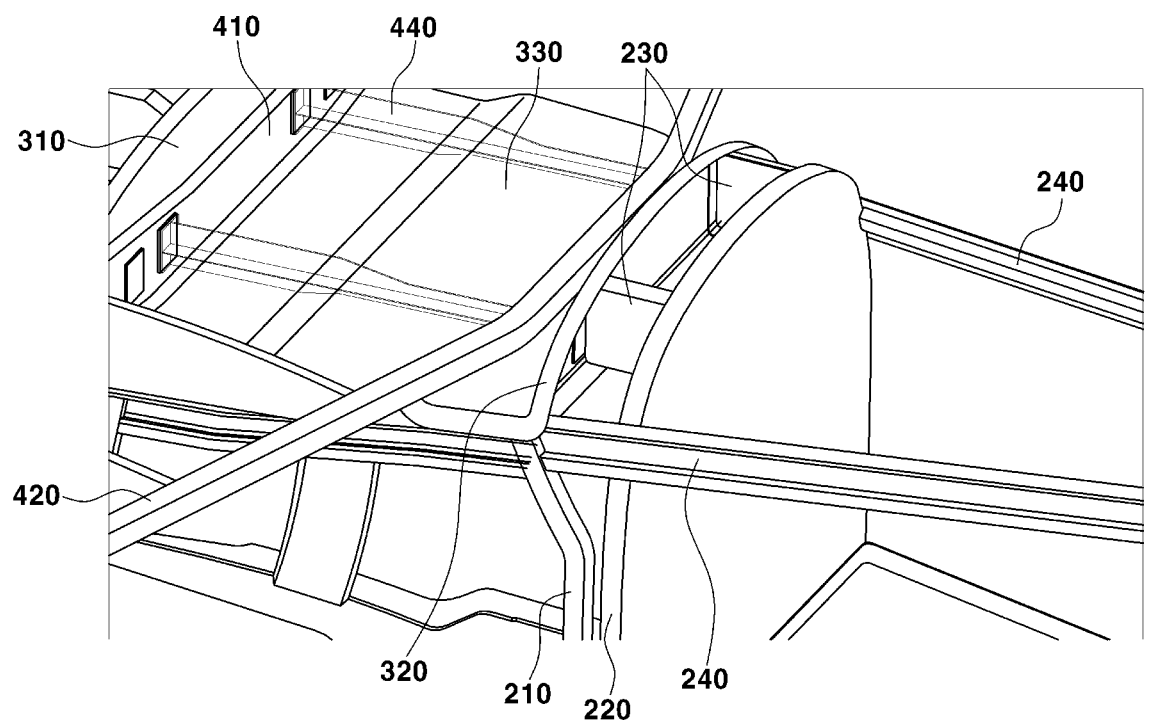
FIG. 4 shows a connection relationship of a wing unit and the rear unit of the dispersion structure for impact of a body according to one or more aspects of the present disclosure.

FIG. 3 shows the rear unit of the dispersion structure for impact of a body according to one or more aspects of the present disclosure and FIG. 4 shows a connection relationship of the wing unit 400 and the rear unit of the dispersion structure for impact of a body according to one or more aspects of the present disclosure.

Referring to FIGS. 3 and 4, the rear unit 200 may be disposed at the rear end with respect to the wings of the body. The rear unit 200 may include a first rear frame 210, a second rear frame 220, a rear center frame 230, and a rear side frame 240. The first rear frame 210 may be connected to the plate part 330. The first rear frame 210 may extend in the height direction along the outer side of the body and may be fastened to the lower end of the second flange part 320 from the floor of the body. According to one or more aspects, the upper end of the first rear frame 210 may be disposed in contact with the second end of the second flange part 320.

The second rear frame 220 may be disposed behind the first rear frame 210. The second rear frame 220 may be formed, for example, in a plate shape adjacently behind the first rear frame 210. The second rear frame 220 may be disposed and/or configured to have a predetermined gap from the upper end of the first rear frame 210 (for example, a gap corresponding to the rear center frame 230, e.g., as shown in FIG. 4), and may be configured to transmit a load coming from the rear end of the body to the upper end of the body in the height direction.

The rear center frame 230 may be disposed between the second flange part 320 and the second rear frame 220. More preferably, the rear center frame 230 may be disposed in the space through which the second flange part 320 and the second rear frame 220 face each other. According to one or more aspects, two rear center frames 230 may be formed at positions corresponding to the positions of the wing frames 440 in the longitudinal direction.

The rear side frame 240 may be disposed in contact with the first rear frame 210 and the second rear frame 220. The rear side frame 240 may be connected to the upper end of the first rear frame 210 and the upper end of the second rear frame 220. The rear side frame 240 may extend rearward in the longitudinal direction of the body. A first end of the rear side frame 240 may be connected to the first rear frame and a second end thereof may extend to the rear of the body.

Figure 5:
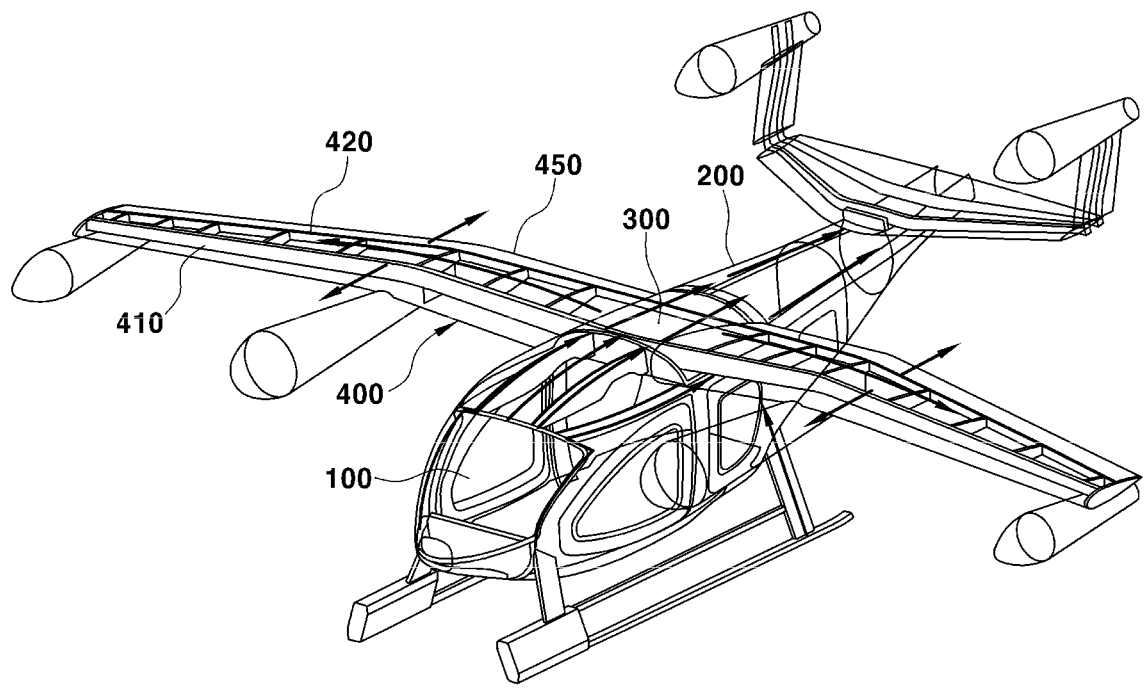
FIG. 5 shows that a longitudinal load and a height-directional load of the dispersion structure for impact of a body are dispersed to the wing unit and the rear of the body according to one or more aspects of the present disclosure.

FIG. 5 shows that a longitudinal load and a height-directional load of the dispersion structure for impact of a body are dispersed to the wing unit 400 and the rear of the body according to one or more aspects of the present disclosure.

Referring to FIG. 5, a load in the longitudinal direction of the body can be transmitted to the first flange part 310 through the window frame 110 and the roof frame 120, and can be transmitted to the first framework 410 through the support fitting member 340 and the wing fitting member 430, and can be dispersed through the skin 450. The load transmitted to the first framework 410 can be transmitted to the second framework 420 through the wing frame 440 and can be dispersed through the skin 450.

According to one or more aspects, when the body crashes and an impact load is applied at a predetermined angle with respect to the front end of the body, a longitudinal load can come inside to the window frame 110 and can be transmitted to the front end of the roof frame 120 connected to the rear end of the window frame 110. The load transmitted to the rear end of the roof frame 120 can be transmitted to the first flange part 310 and then can be transmitted to the support fitting member 340 and the wing fitting member 430. The load transmitted to the support fitting member 340 and the wing fitting member 430 can be transmitted to the first framework 410 and can be dispersed in the longitudinal direction of the first framework 410. The load dispersed in the longitudinal direction of the first framework 410 can be dispersed also in the longitudinal direction of the body through the skin 450. Further, the load transmitted to the first framework 410 can be transmitted to the second framework 420 through the wing frame 440 and can be dispersed in the longitudinal direction of the second framework 420. The load dispersed in the longitudinal direction of the second framework 420 can be dispersed also in the longitudinal direction of the body through the skin 450.

Meanwhile, a load that is applied in the height direction of the body can be transmitted to the second flange part 320 through the first rear frame 210, can be transmitted to the rear side frame 240 and the rear center frame 230 of the rear unit 200 through the second rear frame 220, can be transmitted to the second framework 420 through the support fitting member 340 and the wing fitting member 430, and then can be dispersed through the skin 450. The load transmitted to the second framework 420 can be transmitted to the first framework 410 through the wing frame 440 and then can be dispersed throughout the body.

According to one or more aspects, if a collision load is applied in the height direction of the body, the load that is applied in the height direction of the body may be transmitted to the lower end of the first rear frame 210 and may be transmitted to the second flange part 320 connected to the upper end of the first rear frame 210. In addition, a portion of the load applied to the body in the height direction may be transmitted to the lower end of the second rear frame 220 and may be transmitted to the rear side frame 240 connected to the upper end of the second rear frame 220. A collision load that is applied to the second rear frame 220 can be transmitted to the second flange part 320 and can be transmitted to the wing fitting member 430 through the support fitting member 340 fastened to the second flange part 320. The load transmitted to the support fitting member 340 and the wing fitting member 430 can be transmitted to the second framework 420 and can be dispersed in the longitudinal direction of the second framework 420. The load dispersed in the longitudinal direction of the second framework 420 can be dispersed also in the longitudinal direction of the body through the skin 450. Further, the load transmitted to the second framework 420 can be transmitted to the first framework 410 through the wing frame 440 and can be dispersed in the longitudinal direction of the first framework 410. The load dispersed in the longitudinal direction of the first framework 410 can be dispersed also in the longitudinal direction of the body through the skin 450. A load that is applied in the height direction of the body can be dispersed to the wing unit 400 through the rear unit 200 and the support unit 300.

Figure 6:
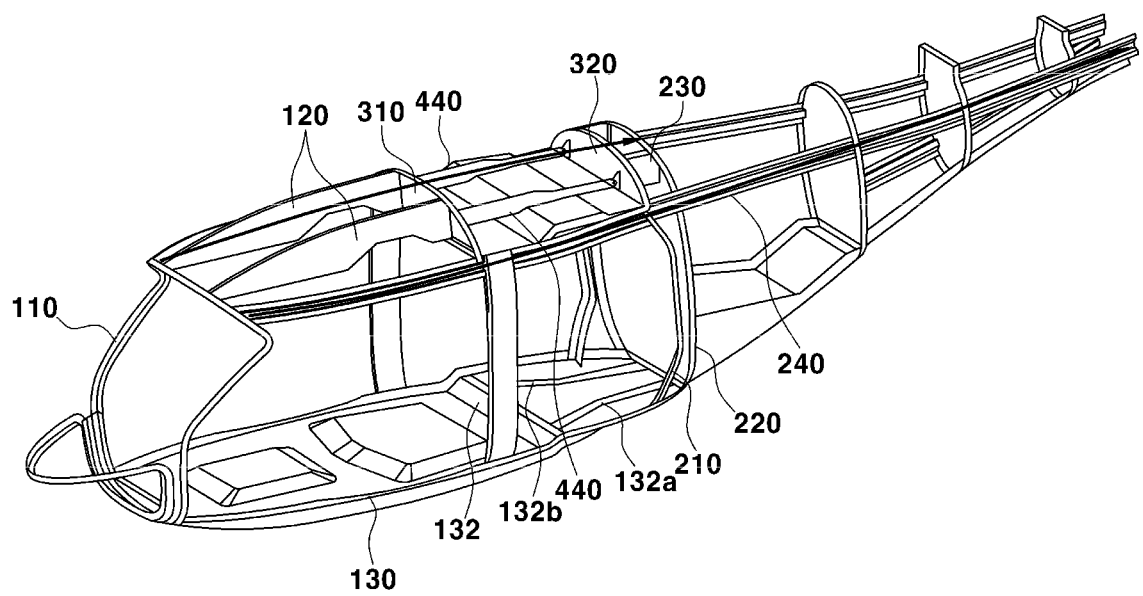
FIG. 6 shows dispersion of a longitudinal center load and a side load of the dispersion structure for impact of a body according to one or more aspects of the present disclosure.

FIG. 6 shows dispersion of a longitudinal center load and a side load of the dispersion structure for impact of a body according to one or more aspects of the present disclosure.

Referring to FIG. 6, a load that is applied in the longitudinal direction of the body can be transmitted to the wing frame 440 from the roof frame 120 through the first flange part 310 and can be transmitted to the rear center frame 230 from the wing frame 440 through the second flange part 320. Side loads that are applied in the longitudinal direction of the body can be transmitted to the rear side frames 240 from the roof frames 120 at both sides of the front along the sides of the plate part 330 through the first rear frame 210.

In more detail, a load applied in the longitudinal direction of the body can be transmitted from the front end to the rear end of the roof frame 120 and can be transmitted to the support fitting member 340 and the wing fitting member 430 adjacent to the first flange part 310 through the first flange part 310. The load transmitted to the support fitting member 340 and the wing fitting member 430 adjacent to the first flange part 310 can be transmitted to the wing frame 440 and can be transmitted to the support fitting member 340 and the wing fitting member 430 adjacent to the second flange part 320. The load transmitted to the support fitting member 340 and the wing fitting member 430 adjacent to the second flange part 320 can be transmitted to the second flange part 320 and then can be transmitted to the rear center frame 230.

A load that is applied in the longitudinal direction of the body, that is, a load that is applied to a side of the body can be transmitted from the front end to the rear end of the body along both ends of the roof frame 120 and can be transmitted to the rear surface of the body in the longitudinal direction of the plate part 330. The load transmitted to the rear end of the plate part 330 can be transmitted to the rear side frame 240 through the first rear frame 210.

In short, the present disclosure provides a dispersion structure for impact of a body that can secure stability by reducing a collision load entering a space where a passenger is positioned by transmitting and dispersing a crash load, which comes inside to the body, to the wing unit 400 and the rear of the body by employing the support unit 300.

Figure 7:
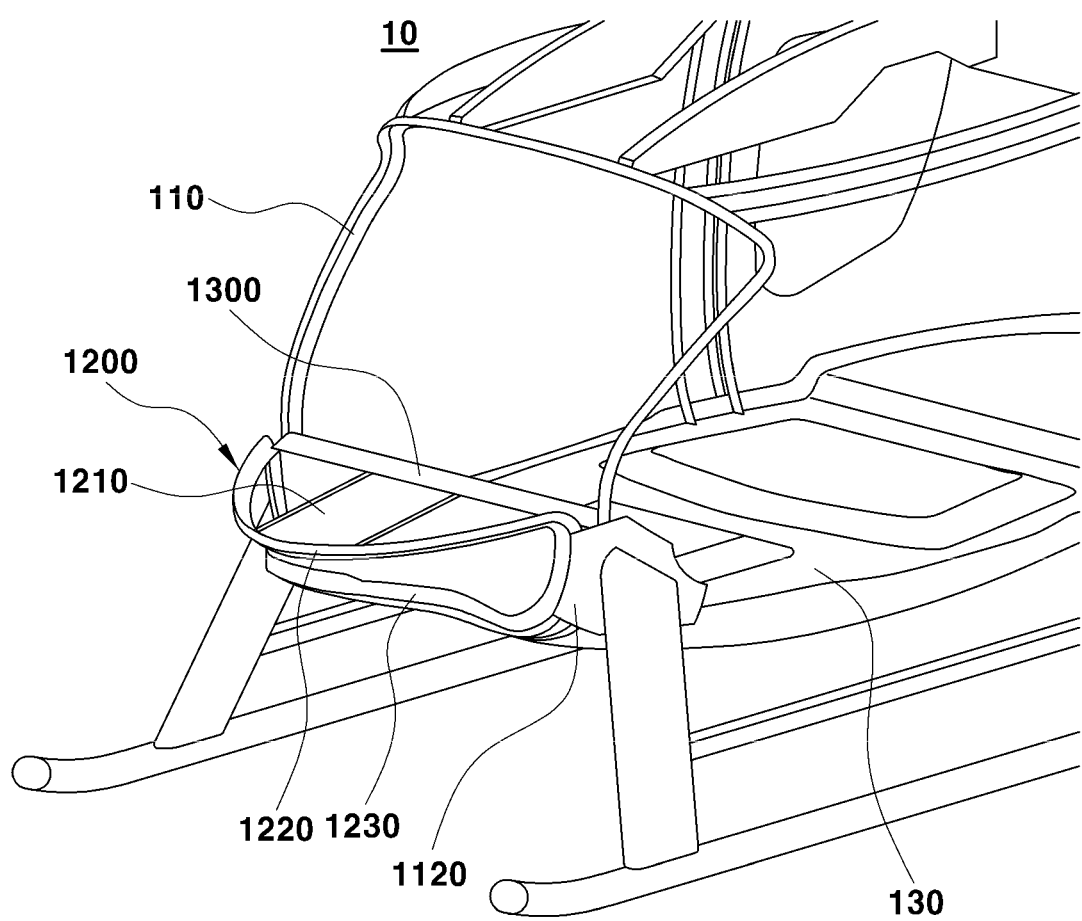
FIG. 7 is a front perspective view of an urban air mobility according to one or more aspects of the present disclosure.

Further, according to one or more aspects of the present disclosure, FIG. 7 is a front perspective view showing an example urban air mobility including the dispersion structure for impact.

An urban air mobility of the present disclosure may include a window frame 110 of a body 10 at which a front glass may be disposed, and a dash reinforcement assembly 1300 configured to surround at least a portion of the lower end of the window frame 110 of the body 10 is provided. The dash reinforcement assembly 1300 may be disposed to separate a crash unit 1200 and an interior space. The urban air mobility is configured to transmit impact between the crash unit 1200 and the dash reinforcement assembly 1300 and prevent a crash box 1210 from coming into the interior space.

The outer side of the rear surface of the dash reinforcement assembly 1300 may be fastened to the window frame 110 and the crash box 1210 may be fastened to the front end of the dash reinforcement assembly 1300. A skid unit 1120 configured to surround the dash reinforcement assembly 1300, the window frame 110, and the outer side and/or outer surface of a surface of the window frame 110 may be included.

The window frame 110 may be disposed at a position at which the interior and the crash box 1210 may be insulated, and the dash reinforcement assembly 1300 may be fastened and supported to the window frame 110. A floor frame 130 forming the floor of the interior may be disposed on the bottom of the window frame 110. The skid unit 1120, configured to support the body 10, may be disposed at the lower end of the floor frame 130.

The skid unit 1120 may be configured to surround at least a portion of the skid supporting the body 10 and portions of the window frame 110, the crash unit 1200, and the dash reinforcement assembly 1300, and may be configured to transmit impulse, which is transmitted through the crash unit 1200, in various directions of the skin 450.

The crash unit 1200 may protrude forward further than the window frame 110. The height-directional bottom of the crash unit 1200 of the present disclosure may be inclined in the longitudinal direction. That is, the lower end of the crash unit 1200 may be inclined in the longitudinal direction of the body 10 and the angle of incline may be set to correspond to the collision angle to the ground of the front of the body 10. The lower end of the crash unit 1200 having an angle of incline may have a first angle of incline and a second angle of incline.

The present disclosure may include the crash unit 1200 protruding forward from the body 10, as described above, thereby providing a dispersion structure for impact configured such that a portion of impulse that is applied to the front of the body 10 may be absorbed by the crash unit 1200 and additional impulse may be transmitted through the window frame 110 and the floor frame 130.

Figure 8A:
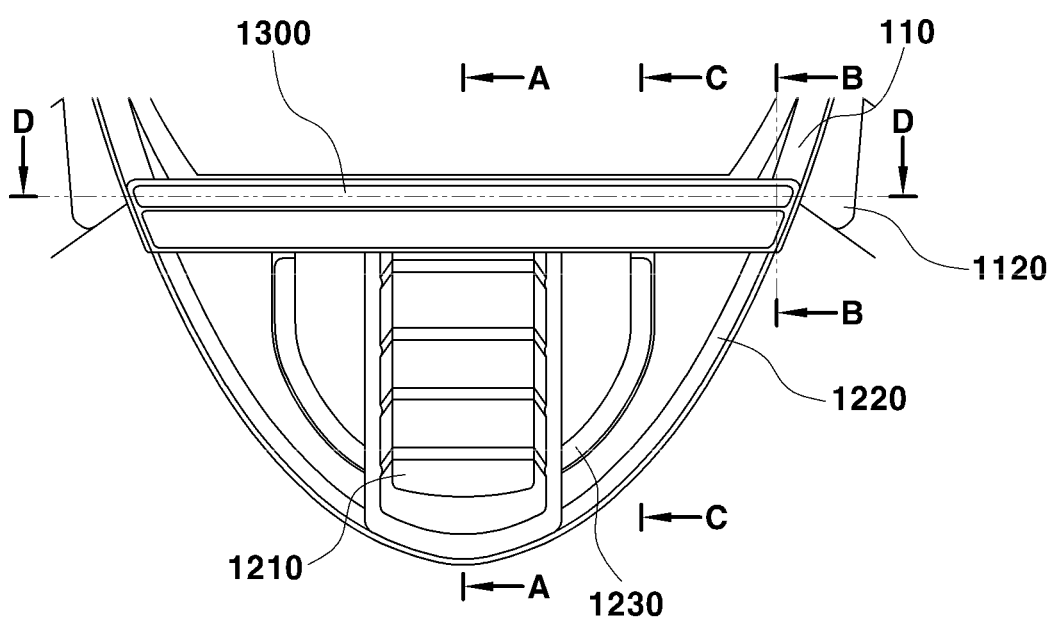
FIG. 8a is a top view of an urban air mobility including a crash unit according to one or more aspects of the present disclosure.
Figure 8B:
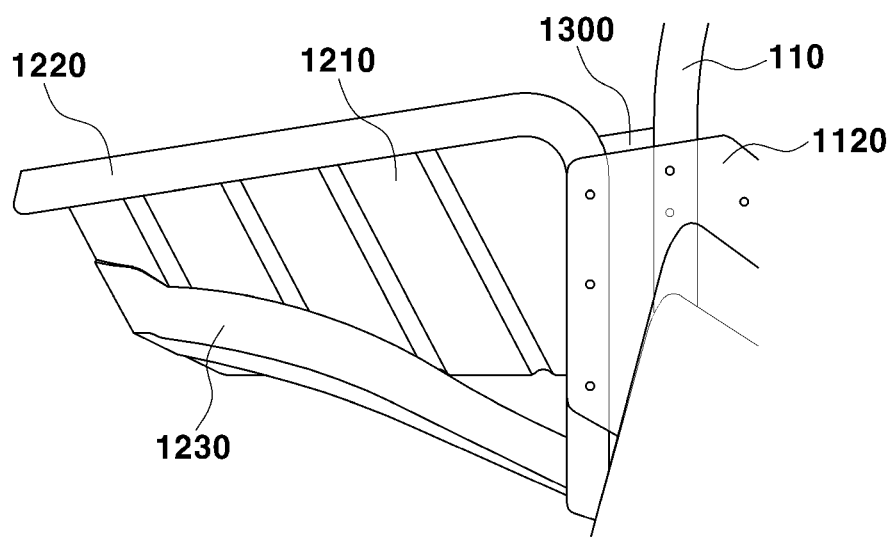
FIG. 8b is a side view of the urban air mobility including a crash unit according to one or more aspects of the present disclosure.
Figure 8C:
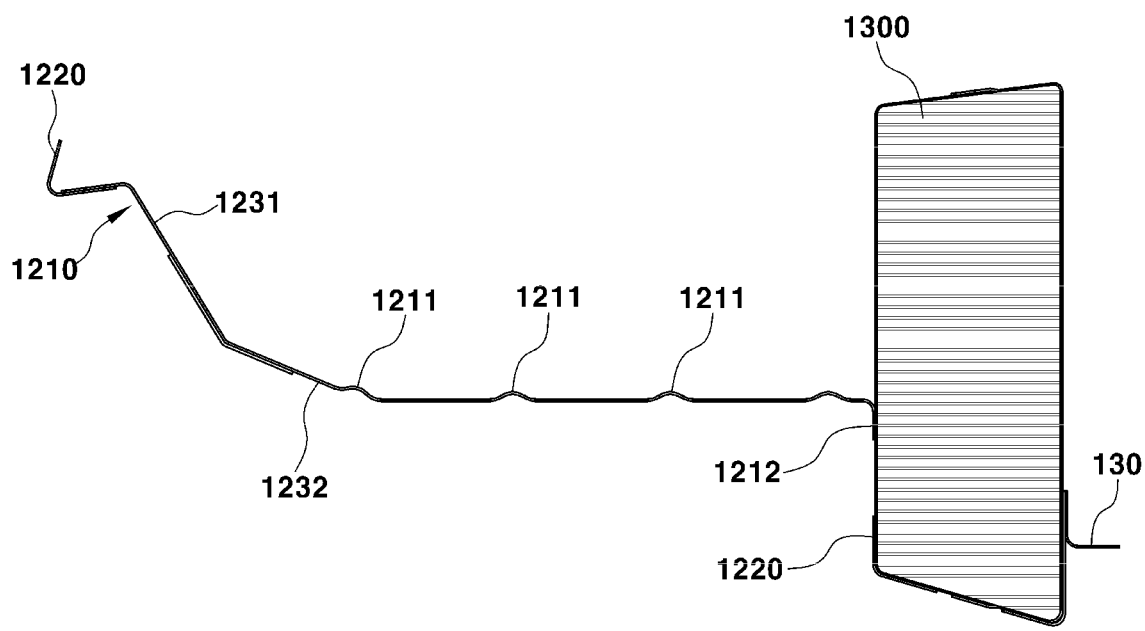
FIG. 8c is a cross-sectional view of the crash unit taken along line A-A of FIG. 8a according to one or more aspects of the present disclosure.

FIGS. 8a to 8c are enlarged views showing the crash unit 1200 protruding forward from the body 10.

As shown in FIG. 8a, the crash unit 1200 may have a streamlined cross-sectional shape protruding forward from the body 10. The crash unit 1200 may be composed of a crash box 1210 formed in the longitudinal direction of the crash unit 1200, an upper frame 1220 disposed between the front end of the crash box 1210 and the dash reinforcement assembly 1300, and a lower frame 1230 fastened to the upper frame 1220 and disposed at the lower end of the front end of the crash box 1210. The front end of the lower frame 1230 may surround the lower end of the front surface of the crash box 1210 and a second end thereof may be fastened to the upper frame 1220 and/or the front surface of the dash reinforcement assembly 1300. Accordingly, impact that is applied to the lower frame 1230 may be transmitted through the upper frame 1220 and may be transmitted to the dash reinforcement assembly 1300 fastened to the upper frame 1220. According to one or more aspects of the present disclosure, both width-directional ends of the lower frame 1230 may be coupled in surface contact with the front surface of the dash reinforcement assembly 1300, and the center portion of the lower frame 1230 may be fastened to the upper frame 1220.

That is, as shown in FIG. 8b, the lower frame 1230 may be disposed at the lower end of the crash unit 1200, between the lower end of the crash box 1210 and the dash reinforcement assembly 1300, and the upper frame 1220 may surround both the upper end of the crash unit 1200 and the front surface of the dash reinforcement assembly 1300.

The upper frame 1220 may surround the upper end of the crash box 1210 and may be disposed to surround the outer side of the front surface of the dash reinforcement assembly 1300. That is, as shown in the figures, the upper frame 1220 may be disposed to form an 'L'-shaped cross-section.

The crash box 1210 may be fastened to the front ends of the upper frame 1220 and the lower frame 1230 in surface contact with the dash reinforcement assembly 1300. The crash box 1210 may be open on the top and may have an empty 'U'-shaped inside. A supporting surface 1212 is formed at a first end of the crash box 1210 at which the crash box 1210 and the dash reinforcement assembly 1300 face each other, and the dash reinforcement assembly 1300 and the supporting surface 1212 are coupled in surface contact with each other. The supporting surface 1212 may bend downward in the height direction and coupled in surface contact with the front surface of an outer reinforcement 1310 of the dash reinforcement assembly 1300 such that impact that is applied through the crash box 1210 may be transmitted to the outer reinforcement 1310.

As shown in FIG. 8c, the supporting surface 1212 extends to the lower end in the height direction in the cross-section of the crash box 1210. Accordingly, impact that is applied to the crash box 1210 may be transmitted to the dash reinforcement assembly 1300 through the supporting surface 1212.

As shown in FIG. 8c showing the cross-section taken along line A-A of FIG. 8a, the crash box 1210 may have at least one or more curved portions 1211 as sections recessed in the longitudinal direction. The curved portions 1211 may be curved in the height direction of the body 10 and the bottom thereof may be recessed to correspond to the curve. Stress may concentrate on the curved portion 1211 if impact is applied to the front of the body 10. Accordingly, if impact is applied to the front end of the crash box 1210, the crash box 1210 may absorb a portion of the shock applied to the front by, for example, folding at the curved portion 1211. The curved portion 1211 of the present disclosure may be formed along the front surface of the crash box 1210 and may have a U-shaped cross-section. Accordingly, if impact is applied to the front surface, the one or more curved portions 1211 of the crash box 1210 may absorb a portion of the applied impact. Impulse that is not absorbed may be transmitted to the dash reinforcement assembly 1300 through, for example, the upper frame 1220, the lower frame 1230, and the supporting surface 1212. Accordingly, the crash box 1210 of the crash unit 1200 may absorb a portion of impact that is applied to the front, and simultaneously, may transmit the other impulse to the entire of the body 10.

Further, the crash box 1210 of the present disclosure may have an inclined portion at the front end front to correspond to an angle made with the ground. The inclined portion may be composed of a first inclined portion 1231 having a first setting angle with respect to the longitudinal direction of the body 10, and a second inclined portion 1232 having a second setting angle, which may be larger than the first angle, with respect to the first inclined portion 1231. The first inclined portion 1231 and the second inclined portion 1232 may be changed in accordance with the collision angle to the ground for the structure of the body 10. The front surface of the first inclined portion 1231 may be surrounded by the lower frame 1230, so impact that is applied when the inclined portion comes in contact with the ground may be transmitted to the upper frame 1220 and the dash reinforcement assembly 1300 through the lower frame 1230.

The inclined portion of the present disclosure may include one or more inclined portions, and in this case, the angles of incline may be different from each other in accordance with the degree of protrusion of the crash unit 1200 and the angle at which the window frame 110 is formed.

Figure 9:
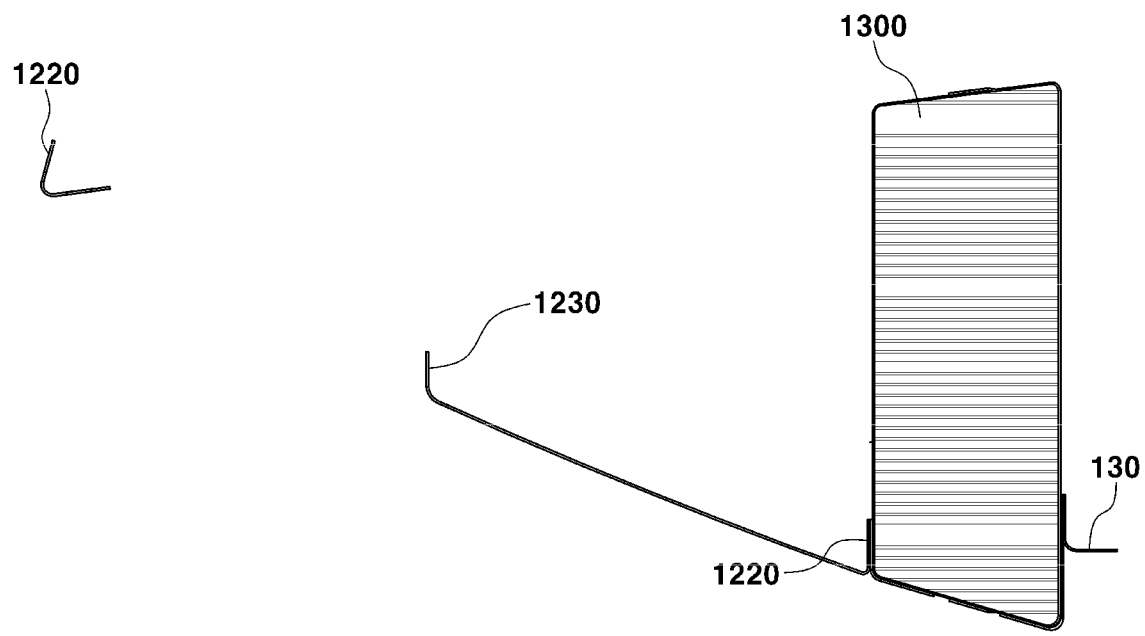
FIG. 9 is a cross-sectional view taken along line C-C of FIG. 8a showing fastening of a lower frame of the crash unit and a dash reinforcement assembly according to one or more aspects of the present disclosure.

FIG. 9 is a cross-sectional view taken along line C-C of FIG. 8a, and according to one or more aspects of the present disclosure, shows a cross-section in which the lower frame 1230 of the crash unit 1200 and the dash reinforcement assembly 1300 are fastened.

An end of the lower frame 1230 may be coupled in surface contact with the dash reinforcement assembly 1300, and the front end thereof may surround the front end of the crash box 1210. The lower frame 1230 may be in contact with the dash reinforcement assembly 1300 such that an inner end thereof extends from the outer surface of the dash reinforcement assembly 1300. That is, the lower frame 1230 may be fastened to extend from the outermost side of the dash reinforcement assembly 1300. Accordingly, a smooth extension surface may be provided between the crash unit 1200 and the body 10. The lower frame 1230 and the outermost surface of the dash reinforcement assembly 1300 may be uniformly formed, so impact that is applied to the front end of the crash unit 1200 can be easily transmitted to the window frame 110 and the floor frame 130.

Figure 10:
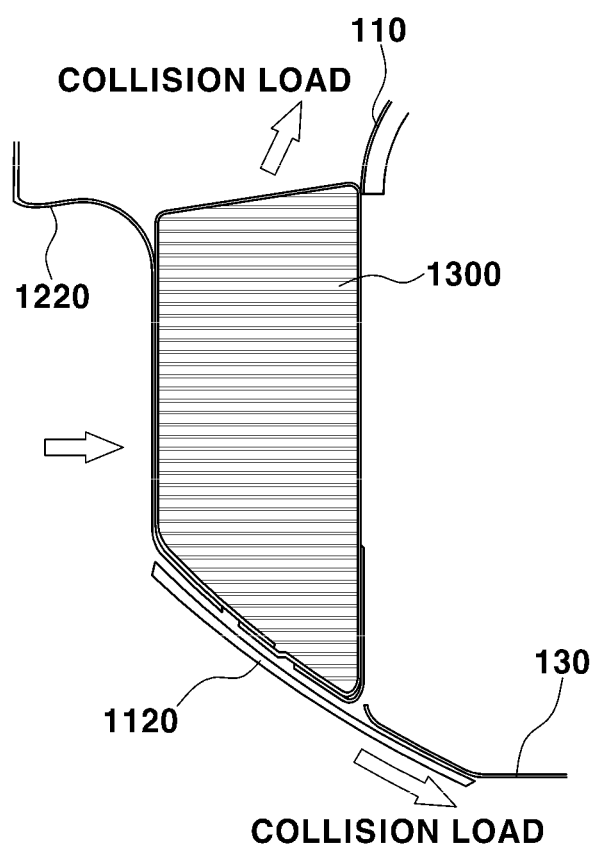
FIG. 10 is a cross-sectional view taken along line B-B of FIG. 8a showing fastening of an upper frame of the crash unit and the dash reinforcement assembly according to one or more aspects of the present disclosure.

FIG. 10 is a cross-sectional view taken along line B-B of FIG. 8c and shows a cross-section of an end at which the crash unit 1200, the dash reinforcement assembly 1300, and the skid unit 1120 are fastened.

The present disclosure includes the upper frame 1220 surrounding the front outer side of the outer reinforcement 1310 of the dash reinforcement assembly 1300 and includes the skid unit 1120 surrounding at least a portion of the outer surface of the upper frame 1220 and the side of the dash reinforcement assembly 1300. The skid unit 1120 surrounds both the side of the dash reinforcement assembly 1300 and the floor frame 130. Accordingly, impact that is applied from the upper frame 1220 may be transmitted to the floor frame 130 through the dash reinforcement assembly 1300.

The present disclosure may include an outer reinforcement 1310 disposed at the outermost side facing the crash unit 1200 of the dash reinforcement assembly 1300 and an inner reinforcement 1320 facing the interior in which a passenger may be positioned, so portions of the outermost surfaces of the outer reinforcement 1310 and the inner reinforcement 1320 may be surrounded by the skid unit 1120. Accordingly, the skid unit 1120 may be configured such that impact that is applied from the crash unit 1200 can move through the floor frame 130, the window frame 110, and the skin 450 of the window frame 110.

As described above, the skid 1120 may simultaneously surround at least portions of the skin of the body 10, the window frame 110, the dash reinforcement assembly 1300, the floor frame 130, and the crash unit 1200, so impact that is applied to the crash unit 1200 at the front can be transmitted to components adjacent to each other.

Figure 11:
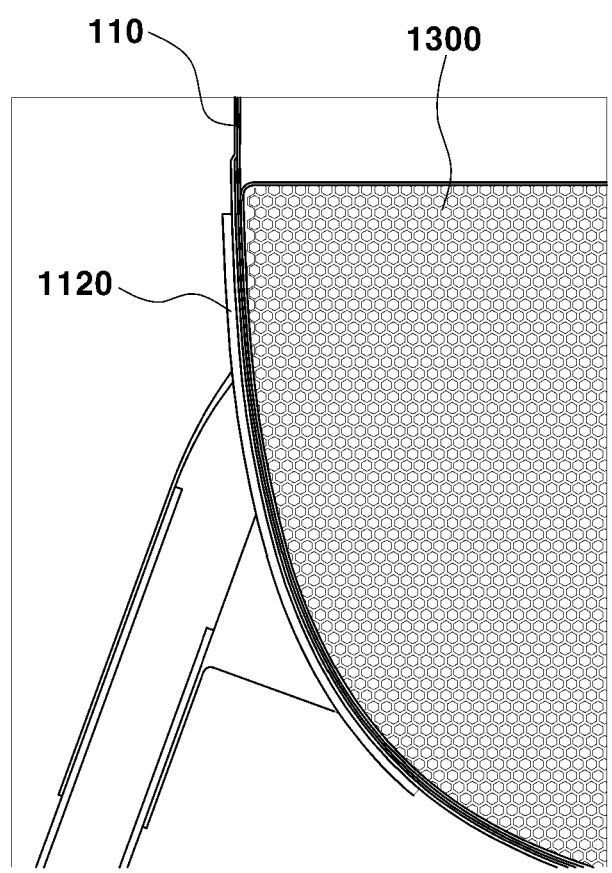
FIG. 11 is a cross-sectional view taken along line D-D of FIG. 8a showing fastening of the dash reinforcement assembly and a skid unit according to one or more aspects of the present disclosure.

That is, as shown in FIG. 11 showing the cross-section taken along line D-D of FIG. 8*a*, impact applied to the skid unit 1120 in the height direction through the skin 450 on the bottom of the window in the cross-section and the window frame 110 may be moved upward, and impact may be transmitted downward to the floor frame 130.

The dash reinforcement assembly 1300 may be configured such that impact that is applied from the crash unit 1200 is transmitted to a component adjacent to the dash reinforcement assembly 1300 through the outer reinforcement 1310 and the shock absorber 1330. In an area adjacent to the skid unit 1120, front impact may be transmitted to the window frame 110 and the floor frame 130 in the height direction.

Figure 12:
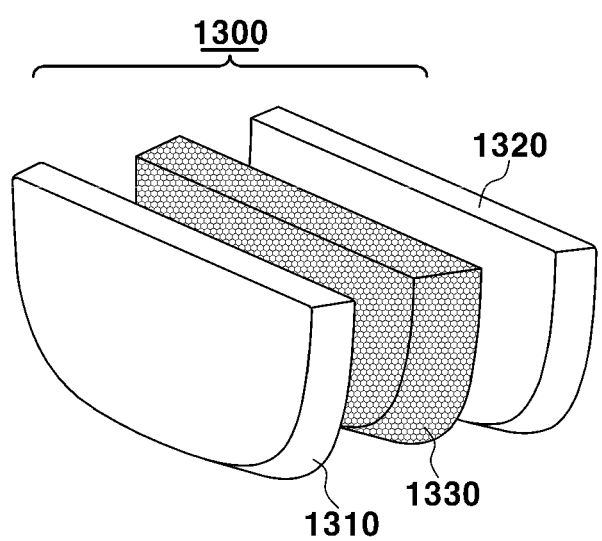
FIG. 12 is a view showing the configuration of the dash reinforcement assembly according to one or more aspects of the present disclosure.

FIG. 12 is a view showing the lower configuration of the dash reinforcement assembly 1300 according to one or more aspects of the present disclosure.

The dash reinforcement assembly 1300 of the present disclosure may be configured to separate the interior of the mobility and the crash unit 1200 and may be fastened to the front frame at which the front glass is disposed. The dash reinforcement assembly 1300 may include an outer reinforcement 1310 fastened to the crash unit 1200 disposed at the front and an inner reinforcement 1320 facing the interior of the body 10 in which a passenger may be positioned, and may include a shock absorber 1330 disposed between the outer reinforcement 1310 and the inner reinforcement 1320. The shock absorber 1330 may be formed, for example, in a porous honeycomb structure and may absorb impact that is transmitted to the outer reinforcement 1310.

The inner reinforcement 1320 may have high rigidity to reduce transmission of a collision load to the interior of the body 10 even though impact is transmitted to the crash unit 1200 at the front, thereby supporting the dash reinforcement assembly 1300 such that the dash reinforcement assembly 1300 may come into the interior in a collision.

The inner reinforcement 1320 may be fastened to the window frame 110 and the floor frame 130 such that impulse that is applied to the dash reinforcement assembly 1300 may be transmitted in the height direction through the window frame 110 and in the longitudinal direction through the floor frame 130.

One or more objectives of the present disclosure is to describe a dispersion structure for impact equipped with a crash unit at the front.

One or more additional or alternative objectives of the present disclosure is to provide a dispersion structure for impact that may disperse impact, which may be applied to a crash unit, to a front frame and a floor frame.

Additionally or alternatively, a dispersion structure for impact for achieving the objectives of the present disclosure may include the following configurations.

According to one or more aspects of the present disclosure, the dispersion structure for impact may include: a front body frame configured to surround a front surface of an airframe; a crash unit that may be disposed at a front end of the body front frame; and a dash reinforcement assembly that may be fastened to the front body frame and disposed on a rear surface of the crash unit.

The crash unit may additionally or alternatively include: a crash box that may be formed in a longitudinal direction of the crash unit; an upper frame that may be disposed between a front end of the crash box and the dash reinforcement assembly; and a lower frame that may be fastened to the upper frame and disposed at a lower end of the front end of the crash box.

The crash box may further or alternatively include one or more curved portions that may be formed in the longitudinal direction of the crash unit and may be disposed in a height direction.

Additionally or alternatively, the lower frame may be configured to surround at least a portion of an outer side of the dash reinforcement assembly.

An end of the crash box may face the dash reinforcement assembly and may further include a supporting surface coupled in surface contact with the dash reinforcement assembly.

Additionally or alternatively, the crash box may include a first inclined portion configured to have a first setting angle with respect to a longitudinal direction of the airframe; and a second inclined portion configured to have a second setting angle larger than the first setting angle with respect to the first inclined portion.

Additionally or alternatively, the dash reinforcement assembly may further include an outer reinforcement formed at a position facing the crash unit; an inner reinforcement disposed adjacent to an interior in which a passenger may be positioned; and a shock absorber disposed between the outer reinforcement and the inner reinforcement.

Additionally or alternatively, the dispersion structure may further include a floor assembly fastened to the dash reinforcement assembly and may be configured to receive impact that is applied to the crash unit.

The floor assembly may further or alternatively include a skid unit overlapping the front body frame and the crash unit in a contact state.

According to one or more additional aspects of the present disclosure, there may be provided a dispersion structure for impact that may include a front body frame configured to surround a front surface of an airframe; a crash unit disposed at a front end of the front body frame and configured such that, for example, a lower end is inclined in a longitudinal direction of an airframe; and a dash reinforcement assembly that may be fastened to the front body frame and disposed on a rear surface of the crash unit.

Additionally or alternatively, the crash unit may include a crash box formed in a longitudinal direction of the crash unit; an upper frame disposed between a front end of the crash box and the dash reinforcement assembly; and a lower frame fastened to the upper frame and disposed at a lower end of the front end of the crash box.

Additionally or alternatively, the crash box may include one or more curved portions formed in the longitudinal direction of the crash unit and disposed in a height direction.

Additionally or alternatively, the lower frame may be configured to surround at least a portion of an outer side of the dash reinforcement assembly.

Additionally or alternatively, an end of the crash box facing the dash reinforcement assembly may further include a supporting surface coupled to and in surface contact with the dash reinforcement assembly.

Additionally or alternatively, the crash box may include a first inclined portion configured to have a first setting angle with respect to a longitudinal direction of the airframe; and a second inclined portion configured to have a second setting angle, larger than the first setting angle, with respect to the first inclined portion.

Additionally or alternatively, the dash reinforcement assembly may include an outer reinforcement formed at a position facing the crash unit; an inner reinforcement disposed adjacent to an interior, for example, configured to position a passenger; and a shock absorber disposed between the outer reinforcement and the inner reinforcement.

Additionally or alternatively, the dispersion structure may further include a floor assembly fastened to the dash reinforcement assembly and may be configured to receive an impact that is applied to the crash unit.

Additionally or alternatively, the floor assembly may include a skid unit overlapping the front body frame and the crash unit in a contact state.

Additionally or alternatively, the dispersion structure may include a skid fastened to the lower end of the skid unit which may support the airframe.

According to the present disclosure, it is possible to achieve, among other things, the following effects from the configuration, combination, and operation relationship described herein.

The present disclosure may have an effect that impact (or at least a portion thereof) that is applied to the front of an airframe may be absorbed, and applied impact (or at least a portion thereof) may be transmitted to the front frame and the floor frame, whereby the impact can be dispersed.

Further, the present disclosure may have an effect that if impact is applied, it is possible to attenuate impact that is applied to the car body by providing a structure for absorbing impact inside the crash unit.

The specification provides examples of the present disclosure. Further, the description provides one or more examples of the present disclosure and the present disclosure may be used in other various combination, changes, and environments. That is, the present disclosure may be changed or modified within the scope of the present disclosure described herein, a range equivalent to the description, and/or within the knowledge or technology in the related art. The example shows an optimum state for achieving the spirit of the present disclosure and may be changed in various ways for the detailed application fields and use of the present disclosure. Therefore, the detailed description of the present disclosure is not intended to limit the present disclosure.

What is claimed is:

1. An aircraft, comprising:
   a front body frame configured to surround a front surface of an airframe;
   a crash unit disposed at a front end of the front body frame, wherein the crash unit comprises a crash box formed in a longitudinal direction of the crash unit; and
   a dash reinforcement assembly fastened to the front body frame and disposed on a rear surface of the crash unit.

2. The aircraft of claim 1, wherein the crash unit further comprises:
   an upper frame disposed between a front end of the crash box and the dash reinforcement assembly; and
   a lower frame fastened to the upper frame and disposed at a lower front end of the crash box.

3. The aircraft of claim 2, wherein the crash box further comprises one or more curved portions, protruding upwards, formed in the longitudinal direction of the crash unit.

4. The aircraft of claim 2, wherein the lower frame is configured to surround at least a portion of an outer side of the dash reinforcement assembly.

5. The aircraft of claim 2, wherein an end of the crash box facing the dash reinforcement assembly further comprises a supporting surface coupled, in surface contact, with the dash reinforcement assembly.

6. The aircraft of claim 2, wherein the crash box comprises:
   a first inclined portion configured to have a first setting angle with respect to a longitudinal direction of the airframe; and
   a second inclined portion configured to have a second setting angle larger than the first setting angle with respect to the first inclined portion.

7. The aircraft of claim 1, wherein the dash reinforcement assembly comprises:
   an outer reinforcement formed at a position facing the crash unit;
   an inner reinforcement disposed adjacent to an interior configured to position a passenger; and
   a shock absorber disposed between the outer reinforcement and the inner reinforcement.

8. The aircraft of claim 1, further comprising a floor assembly fastened to the dash reinforcement assembly and configured to receive impact that is applied to the crash unit.

9. The aircraft of claim 8, wherein the floor assembly further comprises a skid unit overlapping and contacting the front body frame and the crash unit.

10. An aircraft, comprising:
    a front body frame configured to surround a front surface of an airframe;
    a crash unit disposed at a front end of the front body frame and configured such that a lower end is inclined in a longitudinal direction of the airframe, wherein the crash unit comprises a crash box formed in a longitudinal direction of the crash unit; and
    a dash reinforcement assembly fastened to the front body frame and disposed on a rear surface of the crash unit.

11. The aircraft of claim 10, wherein the crash unit further comprises:
    an upper frame disposed between a front end of the crash box and the dash reinforcement assembly; and
    a lower frame fastened to the upper frame and disposed at a lower end of the front end of the crash box.

12. The aircraft of claim 11, wherein the crash box further comprises one or more curved portions formed in the longitudinal direction of the crash unit and disposed in a height direction.

13. The aircraft of claim 11, wherein the crash box comprises a U-shaped cross-section.

14. The aircraft of claim 11, wherein the upper frame comprises an L shaped side cross-section.

15. The aircraft of claim 11, wherein the crash box comprises:
    a first inclined portion configured to have a first setting angle with respect to the longitudinal direction of the airframe; and
    a second inclined portion configured to have a second setting angle larger than the first setting angle with respect to the first inclined portion.

16. The aircraft of claim 10, wherein the dash reinforcement assembly comprises:

an outer reinforcement formed at a position facing the crash unit;

an inner reinforcement disposed adjacent to an interior configured to position a passenger; and a shock absorber disposed between the outer reinforcement and the inner reinforcement.

17. The aircraft of claim 10, further comprising a floor assembly fastened to the dash reinforcement assembly and configured to receive impact that is applied to the crash unit.

18. The aircraft of claim 17, wherein the floor assembly further includes a skid unit overlapping the front body frame and the crash unit in a contact state.

* * * * *